(12) United States Patent
Taniguchi et al.

(10) Patent No.: US 7,053,511 B2
(45) Date of Patent: May 30, 2006

(54) MAGNETIC BEARING CONTROL DEVICE WITH COUNTER FOR TIMED MAINTENANCE

(75) Inventors: Manabu Taniguchi, Osaka (JP); Yasukata Miyagawa, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 112 days.

(21) Appl. No.: 09/891,606

(22) Filed: Jun. 27, 2001

(65) Prior Publication Data

US 2002/0047403 A1   Apr. 25, 2002

(30) Foreign Application Priority Data

Jun. 28, 2000   (JP)   ............. P.2000-194297

(51) Int. Cl.
*H02K 7/09* (2006.01)
*F16C 32/04* (2006.01)
*F16C 39/06* (2006.01)

(52) U.S. Cl. .................... 310/90.5; 702/177
(58) Field of Classification Search ............ 310/90.5; 318/484, 611, 632; 702/177, 187; 417/423.4, 417/423.7
See application file for complete search history.

(56) References Cited

U.S. PATENT DOCUMENTS

| | | | | |
|---|---|---|---|---|
| 4,539,632 A | * | 9/1985 | Hansen et al. | 364/143 |
| 4,612,623 A | * | 9/1986 | Bazarnik | 364/569 |
| 4,811,249 A | * | 3/1989 | Marsh | 702/187 |
| 5,309,075 A | * | 5/1994 | Yokoe et al. | 318/608 |
| 5,924,847 A | * | 7/1999 | Scaringe et al. | 417/42 |
| 6,307,294 B1 | * | 10/2001 | Ooyama et al. | 310/90.5 |
| 6,320,289 B1 | * | 11/2001 | Ueyama et al. | 310/90.5 |
| 6,421,630 B1 | * | 7/2002 | Yamada et al. | 702/177 |
| 2002/0047403 A1 | * | 4/2002 | Taniguchi et al. | 310/90.5 |

FOREIGN PATENT DOCUMENTS

| | | | |
|---|---|---|---|
| JP | 02-176218 | * | 7/1990 |
| JP | 07151146 | * | 6/1995 |
| JP | 09-177781 | * | 7/1997 |
| JP | 11-210673 | | 8/1999 |
| JP | 2002-013533 | * | 1/2002 |

\* cited by examiner

*Primary Examiner*—Karl Tamai
(74) *Attorney, Agent, or Firm*—McGinn IP Law Group, PLLC

(57) ABSTRACT

A DSP (Digital Signal Processor) (15) controls at least a magnetic bearing (23), and compares the accumulated actual work time of a managed component counted by a counter (14) with a preset maintenance time. The DSP (15) outputs a signal instructing the start of the maintenance operation of the managed component, based on the comparison result.

24 Claims, 2 Drawing Sheets

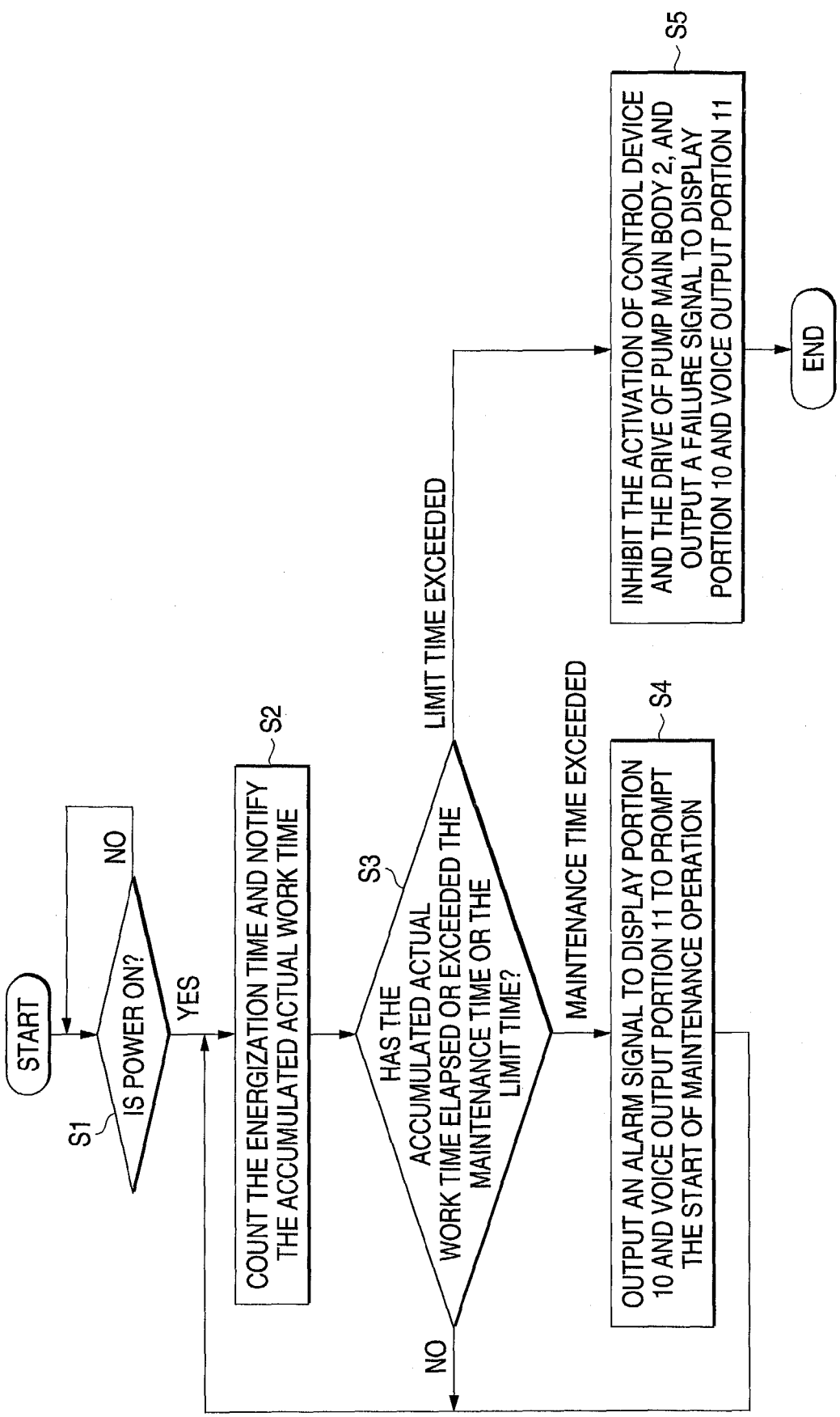

MAGNETIC BEARING CONTROL DEVICE WITH COUNTER FOR TIMED MAINTENANCE

BACKGROUND OF THE INVENTION

1. Technical Field of the Invention

The present invention relates to a magnetic bearing control device for controlling a magnetic bearing that supports a rotor effecting high speed rotation such as TMP (Turbo Molecular Pump) in non-contact manner in a state of magnetic levitation.

2. Related Art

Generally, a magnetic bearing for supporting a rotor in non-contact manner is known as a bearing for the rotor effecting high speed rotation. A device using such magnetic bearing is a Turbo Molecular Pump (hereinafter referred to as "TMP") used in the semiconductor manufacturing devices, for example. The Turbo Molecular Pump typically has a machine main body (pump main body) for supporting a rotation body (rotor) constituting a pump with a control type magnetic bearing in non-contact manner and rotating it with an electric motor, and a controller (magnetic bearing control device) for controlling the machine main body.

In recent years, the TMP magnetic bearing control device as described above has a main stream changed from the conventional analog control method to digital control method along with the advancements of digital technology. The related TMP magnetic bearing control device of the digital control method is disclosed in JP-A-11-210673, for example. This related TMP magnetic bearing control device includes a DSP (Digital Signal Processor) for controlling a magnetic bearing and an electric motor, a flash memory storing a processing program and the control parameters in the DSP, and a real time clock. In the related TMP magnetic bearing control device, the DSP memorizes the operation hysteresis and the malfunction occurrence hysteresis in the flash memory with the time based on the output of real time clock, thereby facilitating the failure or malfunction diagnosis.

By the way, the Turbo Molecular Pump comprises electrical or electronic parts with relatively short service life (duration of life). More specifically, the parts with relatively short duration of life may include a large capacity electrolytic capacitor contained in a cooling fan for cooling a rotor (pump) and a control device main body or a power source circuit. The duration of life of these parts, as well as the operation time of the maintenance operation recommended by the maker, are described in the document such as an instruction manual or a specification sheet. Therefore, the related TMP magnetic bearing control device allows the maintenance operation to be practiced at the user's risk.

However, actually, in the related TMP magnetic bearing control device, because there is no operation of collating or confirming the operation hysteresis memorized in the flash memory or the total operation time calculated from the time when the power source is turned ON to the time when it is turned OFF with respect to the duration of life described in the above document, or due to the document missing, or other reasons, the appropriate maintenance operation can not be surely effected on the user's side at all times, whereby there is the possibility that it would be employed until a malfunction or failure occurred. Therefore, when the related TMP magnetic bearing control device is employed, the maintenance operation can not be performed appropriately on the user's side, resulting in degraded performance or safety of the Turbo Molecular Pump.

SUMMARY OF THE INVENTION

In the light of the above-mentioned problems associated with the conventional art, it is an object of the present invention to provide a magnetic bearing control device which is capable of effecting the safety operation management and the performance maintenance of the control object devices and the control device by notifying automatically the user of the operation time of the maintenance operation and prompting the user to practice the required maintenance operation.

According to a first aspect of the present invention, there is provided a magnetic bearing control device for controlling a magnetic bearing for supporting a rotor in non-contact manner, said magnetic bearing control device comprising:

a digital processor which controls at least said magnetic bearing; and a counter for accumulating and counting an actual work time of a designated managed component;

wherein said digital processor performs a comparison between the accumulated actual work time of the managed component counted by said counter and a preset maintenance time, and outputs a signal indicating start of maintenance operation of said managed component on the basis of the result of the comparison.

In the magnetic bearing control device as constituted above, the digital processor performs a comparison between the accumulated actual work time of the managed component counted by the counter and the preset maintenance time, and outputs a signal indicating the start of maintenance operation of the managed component, on the basis of the result of comparison, whereby the user can be automatically notified of the operation time of maintenance operation.

According to a second aspect of the invention, in the magnetic bearing control device of the first aspect, it is preferable that said digital processor inhibits the activation of said magnetic bearing control device, after the accumulated actual work time of the managed component counted by said counter exceeds a preset limit time.

In this case, when the user does not perform the maintenance operation, the digital processor inhibits the activation of the control device to enable the maintenance operation to be compulsorily practiced.

According to a third aspect of the invention, in the magnetic bearing control device of the first or second aspect, the digital processor may comprise a function of the counter.

In this case, since the counter can be omitted, the control device is reduced in the circuit size.

According to a fourth aspect of the invention, the magnetic bearing control device of one of the first to third aspects may further comprises a display portion for displaying a message or an image on the basis of said signal indicating the start of maintenance operation outputted from the digital processor.

According to a fifth aspect of the invention, the magnetic bearing control device of one of the first to fourth aspects may further comprises a voice output portion for outputting a sound on the basis of said signal indicating the start of maintenance operation outputted from the digital processor.

According to a sixth aspect of the invention, the magnetic bearing control device of one of the first to fifth aspects may further comprises a data input device which allows an user to set said preset maintenance time.

BRIEF DESCRIPTION OF THE DRAWINGS

FIG. 2 is a flowchart showing an operation example of the magnetic bearing control device as shown in FIG. 1.

DETAILED DESCRIPTION OF PREFERRED EMBODIMENT

Figure 1:
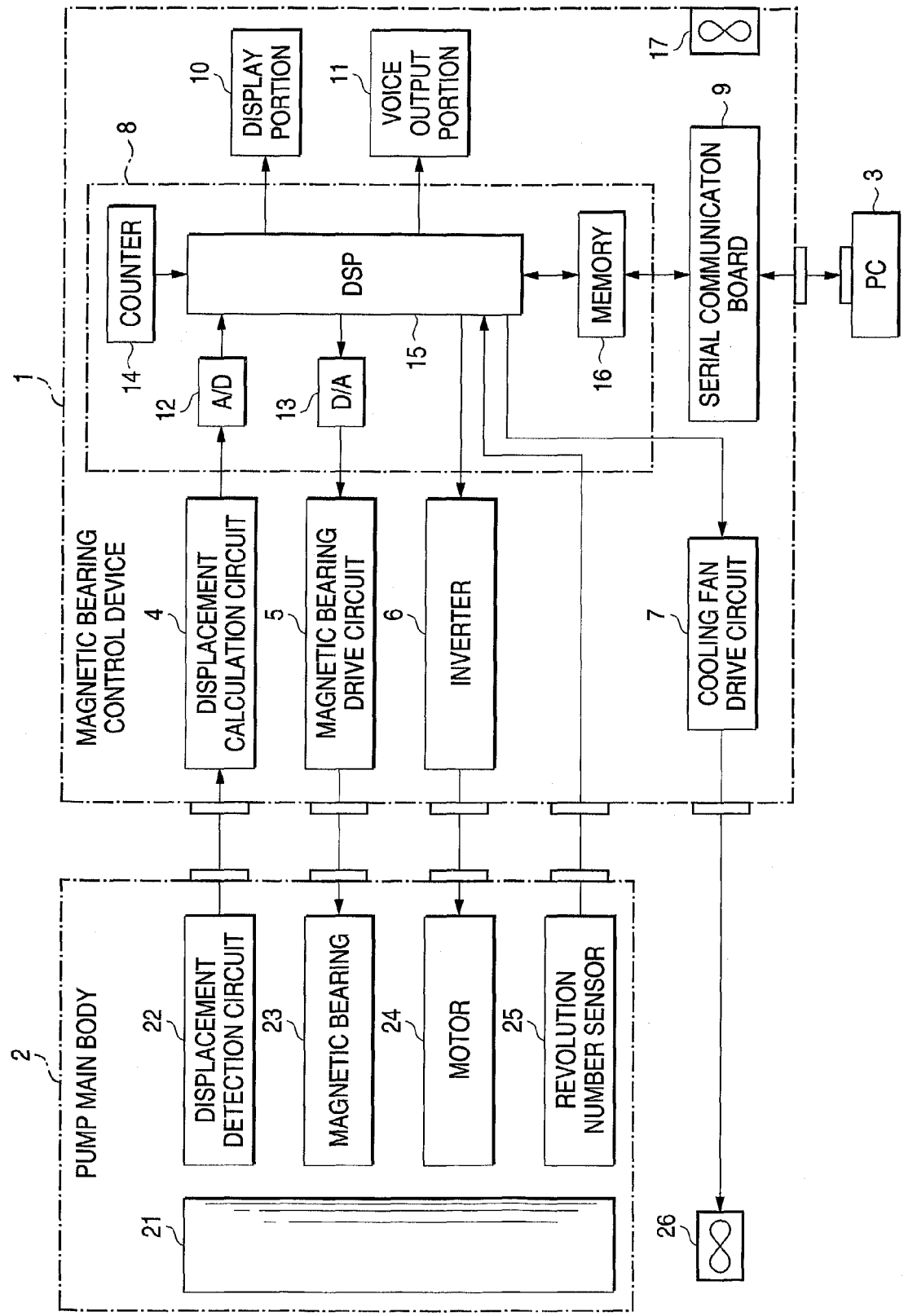
FIG. 1 is a block diagram showing the configuration of a magnetic bearing control device according to one embodiment of the present invention.

The preferred embodiments of a magnetic bearing control device according to the present invention will be described below with reference to the accompanying drawings. In the following explanation, a TMP magnetic bearing control device used in a Turbo Molecular Pump is exemplified.

FIG. 1 is a block diagram showing the configuration of a magnetic bearing control device according to one embodiment of the invention. In FIG. 1, the Turbo Molecular Pump has the magnetic bearing control device 1 and a pump main body 2 of this invention. The magnetic bearing control device 1 is connected to an external computer, for example, a PC (Personal Computer) 3 so that the bidirectional data communication is possible. The magnetic bearing control device 1, the pump main body 2 and the PC 3 are placed at separate locations away from each other, and connected via the cable or communication line, for example.

The magnetic bearing control device 1 is provided with a displacement calculation circuit 4, a magnetic bearing drive circuit 5, an inverter 6, a cooling fan drive circuit 7, a DSP (Digital Signal Processor) board 8, a serial communication board 9, a display portion 10, and a voice output portion 11. An A/D converter 12, a D/A converter 13, a counter 14, a DSP 15 as a digital processor, and a memory 16 are mounted on the DSP board 8. The magnetic bearing control device 1 contains a cooling fan 17 for cooling the control device. The magnetic bearing control device 1 is provided with a power source circuit connected to the commercial AC power supply and having a DC power source for DSP 15 and a back-up power source at the time of power failure, etc. for example, and an operation switch composed of an alternate-type push button with a lamp etc. (not shown).

The pump main body 2 is provided with a rotor 21 constituting a pump, a displacement detecting portion 22 for detecting the displacement of the rotor 21, a magnetic bearing 23 for supporting the rotor 21 in a state of magnetic levitation, a motor 24 for driving and rotating the rotor 21, a revolution number sensor 25 for detecting the number of revolutions of the rotor 21, and a cooling fan 26 for cooling the pump main body 2, which is mounted on the pump main body 2. The pump main body 2 is provided with a touch down bearing (not shown) to regulate the movable range of the rotor 21 in an axial direction and a radial direction, and support the rotor 21 in contact manner, when the pump main body 2 is stopped or the rotor 21 can not be magnetically supported in non-contact manner.

The magnetic bearing 23 includes a plurality of electromagnets (not shown) and is provided with an axial magnetic bearing and a radial magnetic bearing for supporting the rotor 21 in non-contact manner in an axial direction and a radial direction due to magnetic attractive forces of those electromagnets, respectively. The displacement detecting portion 22 includes a plurality of displacement sensors for detecting the displacement of the rotor 21 in the axial direction and the radial direction (not shown).

The motor 24 rotates the rotor 21 supported by the magnetic bearing 23 in non-contact manner, and is constituted by an induction motor, for example. The revolution number sensor 25 detects the number of revolutions of the rotor 21, and outputs a pulse signal in accordance with the detected number of revolutions, for example, to the DSP 15.

In the magnetic bearing control device 1, the displacement calculation circuit 4, the magnetic bearing drive circuit 5, the inverter 6, the DSP 15 and the cooling fan drive circuit 7 are connected to the displacement detecting portion 22, the magnetic bearing 23, the motor 24, the revolution number sensor 25 and the cooling fan 26 of the pump main body 2, which are a control object device, respectively.

The displacement calculation circuit 4 calculates the displacements of the rotor 21 in the axial direction and the radial direction, on the basis of the output signals of a plurality of displacement sensors in the displacement detecting portion 22. The displacement calculation circuit 4 generates a displacement signal corresponding to the calculated displacements in the axial direction and the radial direction, and outputs it via the A/D converter 12 to the DSP 15.

The magnetic bearing drive circuit 5 comprises a plurality of power amplifiers provided corresponding to a plurality of electromagnets for the magnetic bearing 23, and supplies an exciting current to the corresponding electromagnets of the magnetic bearing 23, on the basis of a control current signal input via the D/A converter 13 from the DSP 15. Thereby, the rotor 21 is supported at a predetermined target position in non-contact manner in a state of magnetic levitation by the magnetic bearing 23.

The inverter 6 controls the rotation of the motor 24 in accordance with a revolution number command signal from the DSP 15. The cooling fan drive circuit 7 controls the rotational drive of the cooling fan 26 in accordance with a fan drive signal from the DSP 15.

The serial communication board 9 is connected between the memory 16 on the DSP board 8 and the external PC 3, and functions as a serial interface for effecting the serial transfer of data between them.

The display portion 10 comprises a liquid crystal display, for example, and displays a message or an image including the moving picture stored in the memory 16 in accordance with a command signal from the DSP 15. The message or image displayed on the display portion 10 may include the operation hysteresis information of the control device, the information indicating the operation situation of the pump main body 2, and the information concerning the maintenance management.

The voice output portion 11 comprises a speaker, and outputs a predetermined sound such as an alarm sound or beep tone in accordance with a command signal from the DSP 15. The voice output portion 11 may read and utter a message displayed on the display portion 10 in voice.

The counter 14 accumulates and counts the actual work time of a designated managed component, as will be described later, and comprises a clock pulse oscillator for generating a fixed clock pulse, for example, a count portion for counting the clock pulse in accordance with a command signal from the DSP 15, and a holding memory for holding the addition of the time counted by the count portion as an accumulated actual work time (not shown). In the case where there are a plurality of managed components designated, the counter 14 stores each accumulated actual work time in a table format, for example, to allow the management of each managed component. The counter 14 adds a measured time being counted at present to the accumulated actual work time held in the holding memory at every predetermined time (e.g., one hour) and upon a request from the DSP 15, and notifies a new accumulated actual work time to the DSP 15.

Besides the above, the accumulated actual work time counted by the counter 14 may be output via the DSP 15 to the memory 16 to memorize it. The counter 14 may have a so-called calendar and clock function attached to manage the current date and time, and allow the DSP 15 to refer to the current date and time, as required.

The DSP 15 controls the magnetic bearing 23, the motor 24 and the cooling fan 26 in accordance with a processing program stored in the memory 16. Specifically, the DSP 15 calculates a control current value for each electromagnet of the magnetic bearing 23 in accordance with a displacement signal input from the displacement calculation circuit 4 via the A/D converter 12, and outputs a control current signal corresponding to the control current value via the D/A converter 13 to the magnetic bearing drive circuit 5 to control the magnetic bearing 23. The DSP 15 calculates the number of revolutions of the motor 24 in accordance with a pulse signal from the revolution number sensor 25, and outputs a revolution number command signal based on the calculated number of revolutions to the inverter 6 to control the rotation of the motor 24. The DSP 15 determines the number of revolutions for driving the cooling fan 26 in accordance with the calculated number of revolutions, for example, and outputs a fan drive signal corresponding to the number of revolutions determined to the cooling fan drive circuit 7 to control the rotational drive of the cooling fan 26. Besides the above, a temperature sensor may be provided in the pump main body 2, and the DSP 15 may determine the number of revolutions for driving the cooling fan 26 on the basis of the ambient temperature of the pump main body 2 obtained from the temperature sensor to control the cooling fan 26.

The DSP 15 performs the maintenance management of the control device and the pump main body 2 (control object device) in accordance with a processing program. Specifically, in the magnetic bearing control device 1 of this embodiment, some components having relatively short service life (duration of life) among the components such as the electrical parts or electronic parts contained in the control device and the pump main body 2, are designated as the managed components when they are shipped from the factory, and registered in the memory 16, together with the maintenance time for starting the maintenance operation of the managed component which is recommended for the user and the limit time for replacing the managed component which is recommended for the user. The DSP 15 performs a comparison between the accumulated actual work time of the managed component counted by the counter 14 and the preset maintenance time stored in the memory 16, and manages the maintenance of the managed component, based on the result of comparison. More particularly, the DSP 15 outputs a command signal, including an alarm signal that is a signal instructing the start of maintenance operation of the managed component, to the display portion 10 and the voice output portion 11, when the accumulated actual work time being counted elapses over the maintenance time, for example. Thereby, the display portion 10 displays a message or an image for prompting the start of maintenance operation of the managed component. Also, the voice output portion 11 outputs an alarm sound for prompting the start of maintenance operation.

The message or image prompting the start of the maintenance operation may include the information necessary for the user to perform the optimal maintenance operation, such as a way of practicing the specific inspection operation of the managed component, the check items in the inspection operation, and the inspection positions. The message or image may be stored in an external data storage unit such as a hard disk contained in the PC 3, for example, in addition to the memory 16, and read from the data storage unit via the serial communication board 9 by the DSP 5, as required, and displayed on the display portion 10.

In the above explanation, when the accumulated actual work time counted by the counter 14 elapses over the preset maintenance time, the DSP 15 outputs an alarm signal. However, when the accumulated actual work time counted by the counter 14 falls within a predetermined range before reaching the maintenance time, the DSP 15 may output an alarm signal to notify the operation time of the maintenance operation.

The DSP 15 inhibits the activation of the control device, and the drive of the pump main body 2, after the accumulated actual work time of the managed component exceeds the preset limit time, irrespective of whether an operation instruction is issued by the user on an operation switch. Further, the DSP 15 outputs a command signal, including a failure signal (startup disabled signal) that is a signal indicating that the activation of the control device is inhibited, to the display portion 10 and the voice output portion 11. Thereby, a message or image indicating that the control device and the pump main body 2 is in a state of startup disabled is displayed on the display portion 10. The voice output portion 11 outputs a beep tone indicating the startup disabled state. Note that the display portion 10 and the voice output portion 11 may notify the user of a message of the contents having a request for the replacement of the managed component, in addition to the startup disabled state.

If it is detected that the accumulated actual work time counted by the counter 14 exceeds the limit time while the DSP 15 controls the driving of the pump main body 2, the DSP 15 outputs a failure signal to the display portion 10 and the voice output portion 11 to notify the user of the startup disabled state, and outputs a message of the contents for stopping the driving of the pump main body 2 after a predetermined time to the display portion 10 and the voice output portion 11 to notify the user that the pump main body 2 will be stopped.

Besides the above, the DSP 15 may output a command signal, including a signal instructing to display a message or an image indicating that the accumulated actual work time of the managed component reaches the limit time, to the display portion 10 to display the message or image, and notify the user that the activation of the control device or the driving of the pump main body 2 will be inhibited, before inhibiting the activation of the control device and the driving of the pump main body 2.

When the completion of maintenance operation is input into the DSP 15, the DSP 15 outputs a reset signal to the counter 14 to reset the accumulated actual work time. Note that the completion of maintenance operation is input into the DSP 15 by, for example, the user operating data input device (not shown) such as a keyboard with a ten key. On the other hand, a touch panel as data input device may be provided in the display portion 10 to enter the completion of maintenance operation to the DSP 15.

In the maintenance management using the maintenance time and the limit time in the DSP 15, as described above, some components having shortest service life are registered as the managed components among the contents of the control device and the pump main body 2. When the maintenance time of these managed components elapses, the DSP 15 notify to the user the operation time of the total maintenance operation for the control device and the pump main portion 2. A plurality of managed components may be registered, and the operation time of maintenance operation for each managed component may be notified to the user.

Examples of the managed component may include a cooling fan 26 mounted on the pump main body 2, a cooling fan 17 contained in the control device, and a large capacity electrolytic capacitor for charging in the power source circuit. The specific time set as the maintenance time and the limit time of the cooling fan 26, the cooling fan 17 contained in the control device and the large capacity electrolytic capacitor for charging are 44000 hours (about five years) and 52000 hours (about six years), respectively, for example. In the magnetic bearing control device 1 of this embodiment, the managed component, the maintenance time and the limit time may be additionally registered by the user operating the data input device.

The maintenance time and the limit time of the managed component should be set shorter in some cases than those preset values in the memory 16, depending on the service environments or the service conditions of the managed component. Specifically, in the cooling fan 26 and the large capacity electrolytic capacitor for charging, the maintenance time and the limit time should be set shorter in some cases than the above set time, depending on the ambient temperature or the presence or absence of high frequency components of the input voltage. To cope with such cases, the magnetic bearing control device 1 of this embodiment allows the user to shorten the maintenance time and the limit time by using the data input device.

The memory 16 is preferably composed of a non-volatile memory such as a flash memory, an EPROM or an EEPROM, and stores the processing program for the DSP 15, the maintenance time and the limit time for the managed component, a message or image corresponding to an alarm signal and a failure signal, and coefficients necessary for executing the processing program such as the control parameter of the magnetic bearing 23 used in the processing program. The operation hysteresis information of the control device and the pump main body 2, particularly the total time of the power source being turned ON, the total time of activating the magnetic bearing 23, and the total rotation time of the rotor 21 are saved, e.g., in a table format in the memory 16.

In the magnetic bearing control device 1 constituted in the above way, if the user operates an operation switch to enter an operation instruction, the DSP 15 firstly outputs a control current signal via the D/A converter 13 to the magnetic bearing drive circuit 5, drives the magnetic bearing 23 to move the rotor 21 from the touch down bearing in magnetic levitation, and support it in non-contact manner at a target position. Then, the DSP 15 outputs a revolution number command signal to the inverter 6 to drive the motor 24, and rotate the rotor 21 at a desired revolution number, continuing the operation of the pump main portion 2. Thereafter, if the user operates the operation switch to enter a stop instruction, the DSP 15 outputs a rotation stop command signal for stopping the rotation to the inverter 6 to stop the motor 24 and the rotor 21. Subsequently, the DSP 15 outputs an energization stop signal for stopping the energization to the electromagnets of the magnetic bearing 23, via the D/A converter 13 to the magnetic bearing drive circuit 5 to stop the magnetic bearing 23 to support the rotor 21, and enable the touch down bearing to support the rotor 21.

The magnetic bearing control device 1 operates the pump main body 2 in the above manner, and performs the maintenance management of the designated managed component.

Referring now to FIGS. 1 and 2, a specific operation of the maintenance management in the magnetic bearing control device 1 will be described below. In the following, for the simpler explanation, the operation of the maintenance management for the cooling fan 26 will be exemplified.

FIG. 2 is a flowchart showing an operation example of the magnetic bearing control device as shown in FIG. 1.

As shown in FIG. 2, the DSP 15 discriminates whether or not the power supply is turned on (step S1). If it is detected that the power supply is turned on, the DSP 15 instructs the counter 14 to count the energization time of the cooling fan 26. Note that an instruction from the DSP 15 to the counter 14 is performed after the DSP 15 outputs a fan drive signal instructing the cooling fan drive circuit 7 to drive the cooling fan 26. Thereby, the counter 14 can measure the time (actual work time) for which the cooling fan 26 is actually energized.

Subsequently, the counter 14 notifies the DSP 15 of the accumulated actual work time of the cooling fan 26 that is being counted at every predetermined time and upon a request from the DSP 15 (step S2).

Upon accepting the accumulated actual work time of the cooling fan 26 from the counter 14, the DSP 15 reads the maintenance time and the limit time of the cooling fan 26 from the memory 16 and compares the accumulated actual work time with the maintenance time and the limit time (step S3). If the accumulated actual work time does not elapse the maintenance time, the procedure returns to step S2.

If the accumulated actual work time of the cooling fan 26 elapses the maintenance time, the DSP 15 outputs a command signal including an alarm signal to the display portion 10 and the voice output portion 11 to prompt the user to start the maintenance operation of the cooling fan 26, as described above (step S4). Thereby, the user can be notified of the operation time of the maintenance operation of the cooling fan 26 to take up the appropriate maintenance operation.

If the accumulated actual work time of the cooling fan 26 exceeds the limit time at step S3, the DSP 15 inhibits the activation of the control device and the driving of the pump main body 2, as described above, and outputs a failure signal to the display portion 10 and the voice output portion 11 (step S5). Thereby, the user is notified that the cooling fan 26 is required to be exchanged, and is compelled to perform the maintenance operation by inhibiting the activation of the control device and the driving of the pump main body 2.

As described above, in the magnetic bearing control device 1 of this embodiment, since the DSP 15 compares the accumulated actual work time of the managed component with the preset maintenance time, and outputs a signal instructing the start of the maintenance operation of the managed component, the user can be automatically notified of the operation time of the maintenance operation. Thereby, this magnetic bearing control device 1 can prompt the user to perform the maintenance operation required for the managed component, to allow for the safety operation management and the maintenance of performance of the pump main body 2 and the control device by practicing the maintenance operation.

In the above explanation, the magnetic bearing control device 1 is employed for the Turbo Molecular Pump, but the invention is not limited thereto. The invention is also applicable, so far as the control device controls the magnetic bearing for supporting the rotor in non-contact manner.

Specifically, the magnetic bearing control device 1 of the invention is suitably applicable to a lathe with a spindle using the magnetic bearing, a machining sensor, a tool machine such as a grinder, a compressor using a magnetic bearing, a fluid machine such as a blower, and a magnetic bearing used for a fly-wheel.

In the above explanation, the digital processor is composed of the DSP 15, in which it suffices that the digital processor can control at least the magnetic bearing 23 by a predetermined processing program. Specifically, instead of the DSP 15, an MPU (microprocessor unit) may be employed as the digital processor.

In the above explanation, the counter 14 is provided separately from the DSP 15, but the present invention is not limited thereto. The DSP may implement the function of the counter of accumulating and counting the actual work time of the designated managed component. In the case where the DSP includes the function of the counter, the counter 14 can be omitted, whereby the control device is reduced in the circuit size.

In the above explanation, the display portion 10 and the voice output portion 11 are provided in the magnetic bearing control device 1, but at least one of the display portion 10 and the voice output portion 11 can be omitted. For example, in a case where a message or image displayed on the display portion 10 is output via the serial communication board 9 from the memory 16 to the PC 3, and displayed on the display such as a CRT (Cathode Ray tube) connected to the PC 3, the display portion 10 can be omitted.

The method of connecting the magnetic bearing control device 1 and the PC 3 is not limited to the serial communication board 9 for making the serial transfer, but the magnetic bearing control device 1 and the PC 3 may be connected by way of a modem, for example, to effect the bidirectional data communication with the packet system.

The present invention has the following effects.

With a magnetic bearing control device according to the invention, the digital processor performs a comparison between the accumulated actual work time of the managed component counted by the counter and a preset maintenance time, and outputs a signal indicating the start of maintenance operation of the managed component, on the basis of the result of comparison, whereby the user can be automatically notified of the operation time of maintenance operation. Therefore, in the magnetic bearing control device, the user is prompted to practice the required maintenance operation, and can effect the safety operation management and the performance maintenance of the control object devices and the control device by performing the maintenance operation.

With the magnetic bearing control device of the invention, the digital processor inhibits the activation of the control device, after the accumulated actual work time of the managed component counted by the counter exceeds a preset limit time, thereby allowing the maintenance operation for the managed component to be compulsorily performed. Therefore, it is possible to surely effect the safety operation management and the performance maintenance of the control object devices and the control device.

With the magnetic bearing control device of the invention, the digital processor comprises the counter. Therefore, if the counter is omitted, the control device can be reduced in the circuit size.

What is claimed is:

1. A magnetic bearing control device for controlling a magnetic bearing for supporting a rotor in a non-contact manner, said magnetic bearing control device comprising:

a digital processor which controls said magnetic bearing using a magnetic bearing control signal and that generates a command signal in response to outputting said magnetic bearing control signal; and a counter that starts accumulating and counting an actual work time of said magnetic bearing in response to receiving said command signal from said digital processor, wherein said digital processor performs a comparison between the accumulated actual work time of said magnetic bearing counted by said counter and a preset maintenance time, and outputs a signal indicating a start of a maintenance operation of said magnetic bearing on a basis of a result of the comparison.

2. The magnetic bearing control device according to claim 1, wherein said digital processor inhibits an activation of said magnetic bearing control device, after the accumulated actual work time of the managed component counted by said counter exceeds a preset limit time.

3. The magnetic bearing control device according to claim 2, wherein said digital processor comprises a function of said counter.

4. The magnetic bearing control device according to claim 2, further comprising:

a data input device which allows a user to set said preset maintenance time and said preset limit time.

5. The magnetic bearing control device according to claim 1, wherein said digital processor comprises a function of said counter.

6. The device of claim 5, wherein the counter initiates counting of the actual work time in response to the magnetic bearing control signal being output to the magnetic bearing.

7. The magnetic bearing control device according to claim 1, further comprising:

a display portion for displaying a message or an image on a basis of said signal indicating the start of maintenance operation outputted from the digital processor.

8. The magnetic bearing control device according to claim 1, further comprising:

a voice output portion for outputting a sound on a basis of said signal indicating the start of maintenance operation outputted from the digital processor.

9. The magnetic bearing control device according to claim 1, further comprising:

a data input device which allows a user to set said preset maintenance time.

10. The device of claim 1, wherein said command signal comprises an instruction to the counter to count the actual work time in response to outputting the magnetic bearing control signal to the magnetic bearing.

11. The device of claim 10, wherein the counter initiates counting in response to the instruction from the digital processor to count the actual work time.

12. A magnetic bearing controller comprising:

a processor that controls a magnetic bearing using a magnetic bearing control signal and that generates a command signal in response to outputting the magnet bearing control signal; and a counter that accumulates and counts an actual work time of a managed component in response to receiving said command signal from said processor, wherein said processor further compares the accumulated actual work time with a preset maintenance time.

13. The controller of claim 12, wherein said processor outputs a maintenance signal based upon said comparison.

14. The controller of claim 13, wherein said processor outputs said maintenance signal when said accumulated actual work time is greater than or equal to said present maintenance time.

15. The controller of claim 12, wherein said processor further compares the accumulated actual work time with a preset limit time.

16. The controller of claim 15, wherein said processor inhibits activation of said magnetic bearing based upon the comparison of said accumulated actual work time with said preset limit time.

17. The controller of claim 16, wherein said processor inhibits activation of said magnetic bearing when the accumulated actual work time is greater than or equal to said preset limit time.

18. The controller of claim 12, further comprising a display that is responsive to display a maintenance signal based upon said comparison.

19. The controller of claim 12, further comprising a notification device that is responsive to display a maintenance signal based upon said comparison.

20. The controller of claim 12, further comprising a data input device adapted to receive said preset maintenance time.

21. The controller of claim 12, wherein the command signal comprises an instruction to the counter to initiate counting of the actual work time in response to the magnetic bearing control signal being output to the magnetic bearing.

22. A method for controlling a magnetic bearing comprising:

controlling said magnetic bearing using a processor that provides a magnetic bearing control signal;

generating a command signal using the processor in response to providing said magnetic bearing control signal;

receiving the command signal in a counter;

counting and accumulating an actual work time of said magnetic bearing using said counter that counts and accumulates the actual work time in response to receiving the command signal; and comparing said actual work time and a preset maintenance time using said processor.

23. The method of claim 22, further comprising outputting a maintenance signal based upon said comparison.

24. The method of claim 22, wherein said command signal comprises an instruction to initiate counting of the actual work time in response to the magnetic bearing control signal being provided to the magnetic bearing.

* * * * *